(12) United States Patent
Chen

(10) Patent No.: US 11,974,694 B2
(45) Date of Patent: May 7, 2024

(54) WATERWAY STRUCTURE OF MILK POWDER BREWING MACHINE

(71) Applicant: NINGBO HAWK ELECTRICAL APPLIANCE CO., LTD, Zhejiang (CN)

(72) Inventor: Jianlun Chen, Ningbo (CN)

(73) Assignee: NINGBO HAWK ELECTRICAL APPLIANCE CO., LTD. (CN)

( * ) Notice: Subject to any disclaimer, the term of this patent is extended or adjusted under 35 U.S.C. 154(b) by 664 days.

(21) Appl. No.: 16/992,958

(22) Filed: Aug. 13, 2020

(65) Prior Publication Data
US 2021/0145209 A1 May 20, 2021

(51) Int. Cl.
| | |
|---|---|
| *A47J 31/56* | (2006.01) |
| *A47J 31/40* | (2006.01) |
| *A47J 31/44* | (2006.01) |
| *A47J 31/46* | (2006.01) |

(52) U.S. Cl.
CPC .......... *A47J 31/56* (2013.01); *A47J 31/402* (2013.01); *A47J 31/4403* (2013.01); *A47J 31/46* (2013.01); *A47J 31/465* (2013.01); *A47J 2202/00* (2013.01)

(58) Field of Classification Search
CPC ...... A47J 31/56; A47J 31/402; A47J 31/4403; A47J 31/46; A47J 31/31; A47J 2202/00
See application file for complete search history.

(56) References Cited

U.S. PATENT DOCUMENTS

| | | | |
|---|---|---|---|
| 2014/0069353 A1* | 3/2014 | Jimenez | A47J 31/005 99/283 |
| 2016/0059191 A1* | 3/2016 | Bandixen | B01F 23/232 261/76 |
| 2016/0316516 A1* | 10/2016 | Koebrich | H05B 3/06 |
| 2019/0142211 A1* | 5/2019 | Majer | A47J 31/52 426/231 |

FOREIGN PATENT DOCUMENTS

CN 108324103 A * 7/2018

OTHER PUBLICATIONS

CN108324103A_translation provided by Espacenet.*

* cited by examiner

Primary Examiner — Nathaniel E Wiehe
Assistant Examiner — Keith Brian Assante

(57) ABSTRACT

A waterway structure of the milk powder brewing machine comprising a water storage tank, a plurality of cooling pipes, a thick-film heater and a constant-temperature bin. A water inlet and outlet are formed in the water storage tank, and a spiral pipe is arranged in each cooling pipe. Water flowing from the water outlet is divided and respectively flows into water inlet of each cooling pipe of the plurality of cooling pipes. After the water flowing out from water outlets of the plurality of cooling pipes join together, the water flows into the thick-film heater to be heated to a temperature of 90-100° C. The hot water flows into the spiral pipe to be cooled and flows into the constant-temperature bin after being cooled to a preset temperature. The waterway structure of the present disclosure enhances the cooling effect, realizes instant heating, achieves reuse of energy, and improves the energy-saving effect.

8 Claims, 4 Drawing Sheets

WATERWAY STRUCTURE OF MILK POWDER BREWING MACHINE

TECHNICAL FIELD

This disclosure generally relates to the technical field of waterway control of milk powder brewing machines, and more particularly, to a waterway structure of a milk powder brewing machine.

BACKGROUND

The conventional milk powder brewing is normally a manual brewing process. The milk powder is manually fed into a feeding bottle, hot water is poured into the bottle, and then the appropriate amount of milk powder and water are mixed such that the liquid milk is obtained. The aforesaid method has the following shortcomings: first, the water temperature is difficult to control. For example, a baby may be scalded if the water temperature is excessively high, and the milk in the bottle may get cold before being finished if the water temperature is excessively low; second, due to the caking problem occur in the brewing process, the liquid milk may be non-uniform, severely affecting a baby's eating; third, the proportion of milk powder and water is hard to master, which makes the liquid milk either thin or thick, resulting in the baby's starvation or indigestion after eating. Although various milk powder brewing machines are sold on the market, their shortcomings in waterway design inevitably exist: first, the single cooling design leads to a poor cooling effect; second, the heating pipes heated by ordinary heating wires fail to achieve an instant heating; third, the energy-saving effect is poor.

SUMMARY

The purpose of the present disclosure is to provide a waterway structure of a milk powder brewing machine, which is capable of enhancing the cooling effect, realizing an instant heating, achieving a reuse of energy and improving the energy-saving effect.

To achieve the above purpose, the present disclosure adopts the following technical solution: the waterway structure of the milk powder brewing machine of the present disclosure comprises a water storage tank, more than one first cooling pipe, a thick-film heater and a constant-temperature bin which are communicated with each other; a normal-temperature water inlet and a normal-temperature water outlet are formed in the water storage tank, and a second spiral pipe is arranged in each first cooling pipe; the normal-temperature water outlet is connected with first water inlets of the first cooling pipes, and first water outlets of all first cooling pipes are connected with an inlet of the thick-film heater; an outlet of the thick-film heater is connected with an inlet of the second spiral pipe, and an outlet of the second spiral pipe is connected with the constant-temperature bin. The normal-temperature water flowing from the normal-temperature water outlet is divided and respectively flows into the first water inlets of the first cooling pipes; after the water flowing out from the first water outlets of all the first cooling pipes join together, the water flows into the thick-film heater to be heated; the hot water flowing out from the thick-film heater flows into the second spiral pipe to be cooled, and after being cooled to a preset temperature, the water flows into the constant-temperature bin.

In another aspect of the present invention, to improve the cooling efficiency, a first spiral cooling pipe is connected between the second spiral pipe and the outlet of the thick-film heater.

In another aspect of the present invention, to improve the cooling effect, allow the number of times of water cooling to be selected according to the variation of ambient temperature, and finally enable the water in the constant-temperature bin to meet users' requirements, a pipeline switching unit capable of switching between a primary water cooling and a secondary water cooling according to the water temperature is arranged between the constant-temperature bin and the second spiral pipe. The pipeline switching unit comprises a temperature detector capable of adjusting the number of times of water cooling according to the water temperature and a three-way solenoid valve. The temperature detector is arranged on a third water outlet of the second spiral pipe, and the three-way solenoid valve is arranged on the pipeline at the rear end of the temperature detector. One ends of the two outlets of the three-way solenoid valve are connected with the constant-temperature bin, and the other ends of the two outlets of the three-way solenoid valve are connected with a third water inlet of the rest second spiral pipe for realizing the secondary water cooling. After the secondary water cooling is completed, the hot water enters the constant-temperature bin.

In another aspect of the present invention, to facilitate the operation, a three-way pipe is connected between the three-way solenoid valve and the constant-temperature bin, wherein the first pipe opening of the three-way pipe is connected with the three-way solenoid valve, the second pipe opening of the three-way pipe is connected with the constant-temperature bin, and the third pipe opening of the three-way pipe is connected with the third water outlet of the second spiral pipe in the secondary water cooling.

In another aspect of the present invention, to make the whole waterway simpler, there are two first cooling pipes, which respectively are a first cooling pipe A and a first cooling pipe B, wherein a second spiral pipe A is arranged in the first cooling pipe A, and a second spiral pipe B is arranged in the first cooling pipe B. The water flowing from the second water outlet of the first spiral cooling pipe flows into the second spiral pipe A for the primary water cooling. After being primarily cooled, the water flows out and is detected by the temperature detector. When the detected temperature is lower than or equal to the preset temperature, the inlet of the three-way solenoid valve is controlled to communicate with the constant-temperature bin through the three-way pipe, thereby delivering the hot water into the constant-temperature bin. At this point, the pipeline of the three-way solenoid valve and the second spiral pipe B is controlled to close. When the temperature detected by the temperature detector is higher than the preset temperature, the inlet of the three-way solenoid valve is controlled to communicate with the pipeline of the second spiral pipe B, and the pipeline connecting the three-way solenoid valve and the three-way pipe is closed. In this way, the hot water is delivered into the second spiral pipe B for the secondary water cooling, and after being cooled, the hot water is delivered into the three-way pipe and then flows into the constant-temperature bin.

In another aspect of the present invention, the temperature detector is an NTC temperature sensor.

In another aspect of the present invention, to facilitate the detection of water flow, a flow monitor is connected at the inlet of the thick-film heater.

In another aspect of the present invention, to make the whole waterway simpler, the three-way solenoid valve is replaced by a one-way valve, and the third water outlet of the second spiral pipe A is connected with the first pipe opening of the three-way pipe. A branch path connected with the third water inlet of the second spiral pipe B is branched from the connection end of the third water outlet and the three-way pipe, and the one-way valve is arranged on the branch path. The third water outlet of the second spiral pipe B is connected with the second pipe opening of the three-way pipe, and the second pipe opening of the three-way pipe is connected with the constant-temperature bin. The liquid level in the third water inlet of the second spiral pipe A is higher than that in the three-way pipe.

In another aspect of the present invention, to facilitate the internal water circulation, the bottoms of the first cooling pipes are communicated through a communicating pipe.

Compared with the prior art, the present disclosure has the following advantages: the water in the water storage tank passes through the first cooling pipe and then enters the thick-film heater, allowing the heat generated during the heat exchange of the first spiral cooling pipe to be effectively utilized to preheat the water entering the thick-film heater; the aforesaid design not only ensures the temperature of the water heated by the thick-film heater, but also improves the energy-saving effect; as the aforesaid structural design enhances the cooling effect, realizes instant heating, and achieves reuse of energy, the energy-saving effect of the present disclosure is significantly improved.

Marking Instructions of the Figures: 1—Water Storage Tank, 2—The First Cooling Pipe, 3—Thick-film Heater, 4—The First Spiral Cooling Pipe, 5—Constant-temperature Bin, 6—Normal-temperature Water Inlet, 7—Normal-temperature Water Outlet, 8—The First Water Inlet, 9—The First Water Outlet, 10—The Second Water Inlet, 11—The Second Spiral Pipe, 12—Pipeline Switching Unit, 13—The Third Water Outlet, 14—Temperature Detector, 15—Three-way Solenoid Valve, 16—The Third Water Inlet, 17—Three-way Pipe, 17-1—The First Pipe Opening, 17-2—The Second Pipe Opening, 17-3—The Third Pipe Opening, A2-1—The First Cooling Pipe, B2-2—The First Cooling Pipe, A11-1—The Second Spiral Pipe, B11-2—The Second Spiral Pipe, 18—Flow Monitor, 19—Branch Path, 20—One-way Valve, 21—Communicating Pipe.

DETAILED DESCRIPTION

To make the technical solution of the present disclosure easy to understand, drawings are combined hereinafter to further elaborate the implementation of the techniques of the present disclosure.

Embodiment 1

Figure 1:
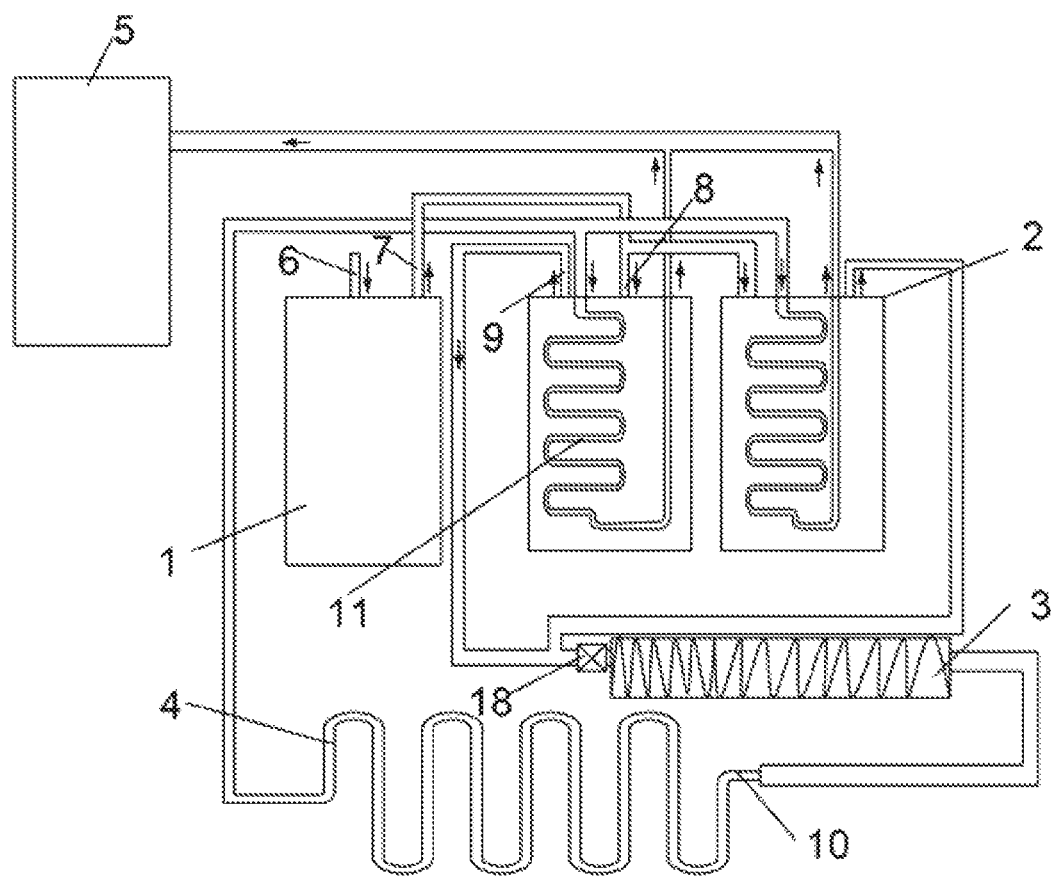
FIG. 1 is a conceptual diagram illustrating an example waterway structure of the milk powder brewing machine in embodiment 1.

As shown in FIG. 1, the waterway structure of the milk powder brewing machine of the present disclosure comprises a water storage tank 1, more than one first cooling pipe 2, a thick-film heater 3 and a constant-temperature bin 5 which are communicated with each other. A normal-temperature water inlet 6 and a normal-temperature water outlet 7 are formed in the water storage tank 1, and a second spiral pipe 11 is arranged in each first cooling pipe 2. The normal-temperature water outlet 7 is connected with first water inlets 8 of the first cooling pipes 2, and first water outlets 9 of all first cooling pipes 2 are connected with an inlet of the thick-film heater 3. An outlet of the thick-film heater 3 is connected with an inlet of the second spiral pipe 11, and an outlet of the second spiral pipe 11 is connected with the constant-temperature bin 5. By means of the aforesaid design, the normal-temperature water flowing from the normal-temperature water outlet 7 is divided and respectively flows into the first water inlets 8 of the first cooling pipes 2. After the water flowing out from the first water outlets 9 of all the first cooling pipes 2 join together, the water flows into the thick-film heater 3 to be heated to a temperature of 90-100° C. The hot water flowing out from the thick-film heater 3 flows into the second spiral pipe 11 to be cooled, and after being cooled to a preset temperature, the water flows into the constant-temperature bin 5.

To further improve the cooling efficiency, a first spiral cooling pipe 4 is connected between the second spiral pipe 11 and the outlet of the thick-film heater 3.

In this embodiment, through the arrangement of the two first cooling pipes 2, the water in the first spiral cooling pipe 4 may be divided and cooled, which further improves the cooling effect of the present disclosure.

According to the aforesaid structural design, the thick-film heater 3 is utilized to rapidly heat the water delivered into the thick-film heater 3 to a temperature of 90-100° C., and through the spiral-shaped configuration of the first spiral cooling pipe 4, the duration of water flowing is significantly prolonged, thus achieving an ideal cooling effect. In this way, the pre-cooling of the water is realized. The pre-cooled water passes through the first spiral cooling pipe 4 for water cooling. At this point, the water in the first spiral cooling pipe 4 exchanges heat with the first cooling pipe 2, which effectively cools the water in the first spiral cooling pipe 4. Subsequently, the water flowing into the first cooling pipe 2 from the water storage tank 1 is heated, and then the heated water in the first cooling pipe 2 is delivered into the thick-film heater 3, thereby enabling the thick-film heater 3 to raise the water temperature to 90-100° C. within a short time. Thus, the reuse of energy is realized. The water in the water storage tank 1 passes through the first cooling pipe 2 and then enters the thick-film heater 3, allowing the heat generated during the heat exchange of the first spiral cooling pipe 4 to be effectively utilized to preheat the water entering the thick-film heater 3. The aforesaid design not only ensures the temperature of the water heated by the thick-film heater 3, but also improves the energy-saving effect. As the aforesaid structural design enhances the cooling effect, realizes instant heating, and achieves reuse of energy, the energy-saving effect of the present disclosure is significantly improved.

Embodiment 2

Figure 2:
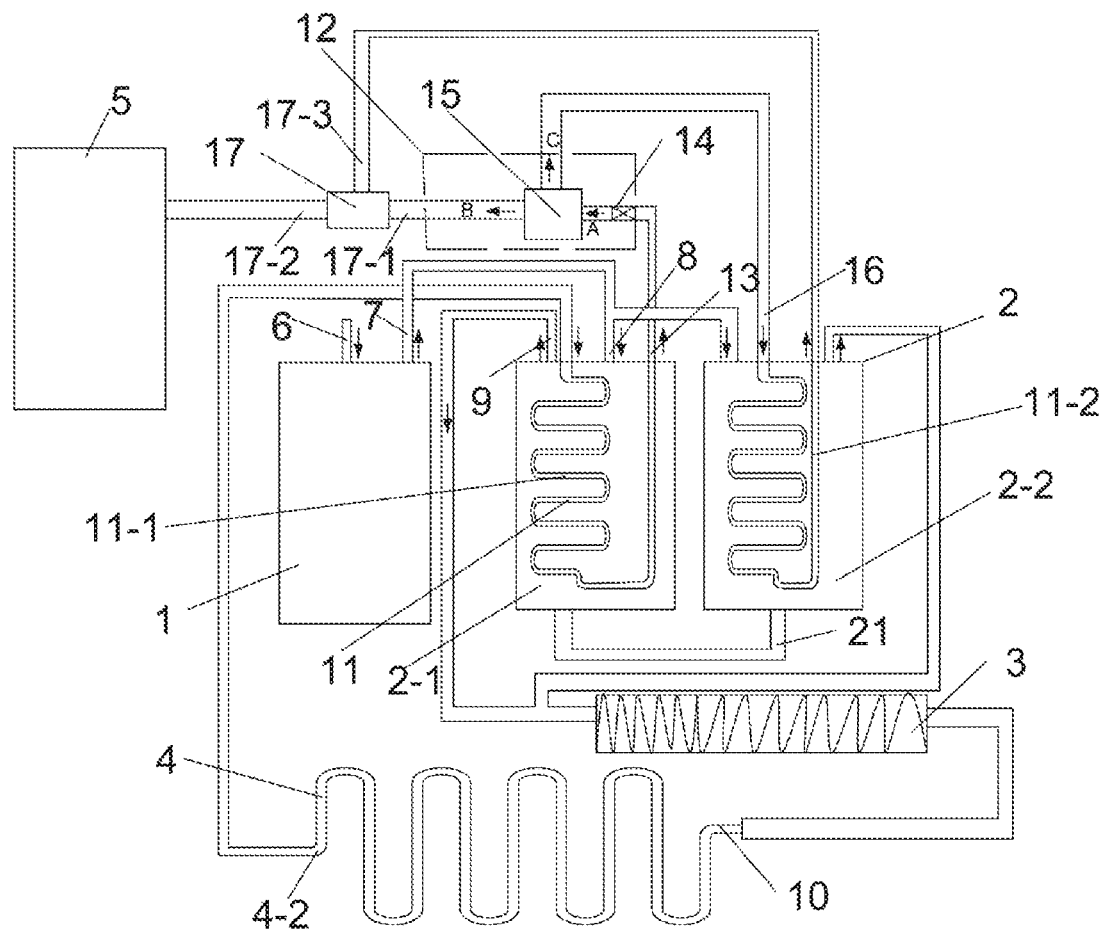
FIG. 2 is a conceptual diagram illustrating an example waterway structure of the milk powder brewing machine in embodiment 2.

As shown in FIG. 2, in this embodiment, the milk powder brewing machine of the present disclosure adopts another waterway structure. To further improve the cooling effect, allow the number of times of water cooling to be selected according to the variation of ambient temperature, and finally enable the water in the constant-temperature bin 5 to meet users' requirements, a pipeline switching unit 12 capable of switching between a primary water cooling and a secondary water cooling according to the water temperature is arranged between the constant-temperature bin 5 and the second spiral pipe 11. The pipeline switching unit 12 comprises a temperature detector 14 capable of adjusting the number of times of water cooling according to the water temperature and a three-way solenoid valve 15. The temperature detector 14 is arranged on a third water outlet 13 of the second spiral pipe 11, and the three-way solenoid valve 15 is arranged on the pipeline at the rear end of the temperature detector 14. One ends of the two outlets of the three-way solenoid valve 15 are connected with the constant-temperature bin 5, and the other ends of the two outlets of the three-way solenoid valve 15 are connected with a third water inlet 16 of the rest second spiral pipe 11 for realizing the secondary water cooling. After the secondary water cooling is completed, the hot water enters the constant-temperature bin 5.

Further, to facilitate the operation, a three-way pipe 17 is connected between the three-way solenoid valve 15 and the constant-temperature bin 5, wherein the first pipe opening 17-1 of the three-way pipe 17 is connected with the three-way solenoid valve 15, the second pipe opening 17-2 of the three-way pipe 17 is connected with the constant-temperature bin 5, and the third pipe opening 17-3 of the three-way pipe 17 is connected with the third water outlet 13 of the second spiral pipe 11 in the secondary water cooling.

Preferably, to make the whole waterway simpler, there are two first cooling pipes 2, which respectively are a first cooling pipe A2-1 and a first cooling pipe B2-2, wherein a second spiral pipe A11-1 is arranged in the first cooling pipe A2-1, and a second spiral pipe B11-2 is arranged in the first cooling pipe B2-2. The water flowing from the second water outlet 4-2 of the first spiral cooling pipe 4 flows into the second spiral pipe A11-1 for the primary water cooling. After being primarily cooled, the water flows out and is detected by the temperature detector 14. When the detected temperature is lower than or equal to the preset temperature, the inlet of the three-way solenoid valve 15 is controlled to communicate with the constant-temperature bin 5 through the three-way pipe 17, thereby delivering the hot water into the constant-temperature bin 5. At this point, the pipeline of the three-way solenoid valve 15 and the second spiral pipe B11-2 is controlled to close. Contrarily, when the temperature detected by the temperature detector 14 is higher than the preset temperature, the inlet of the three-way solenoid valve 15 is controlled to communicate with the pipeline of the second spiral pipe B11-2, and the pipeline connecting the three-way solenoid valve 15 and the three-way pipe 17 is closed. In this way, the hot water is delivered into the second spiral pipe B11-2 for the secondary water cooling, and after being cooled, the hot water is delivered into the three-way pipe 17 and then flows into the constant-temperature bin 5.

Further, the temperature detector 14 is an NTC temperature sensor.

In this embodiment, to master the temperature condition of the temperature detector 14, a controller is pre-arranged, and temperature requirements are preset in the controller. The preset temperature may be lower in summer and higher in winter. During summer, the temperature of the corresponding pipeline detected by the temperature detector 14 is compared with the preset temperature in the controller. When the detected temperature is higher than the preset temperature, the pipeline of the three-way solenoid valve 15 is immediately switched by the controller, thus allowing water to flow into the second spiral pipe B11-2 for the secondary water cooling, and when the detected temperature is lower than the preset temperature, the pipeline of the three-way solenoid valve 15 is switched by the controller, thereby ensuring that the water directly flows into the three-way pipe 17 and then enters the constant-temperature bin 5 instead of flowing into the second spiral pipe B11-2. It should be noted that, how to preset the temperature in the controller, how the controller collects the temperature information of the temperature detector 14 and compares the obtained temperature with the preset temperature, and how the controller controls the three-way solenoid valve 15 to switch the pipeline are all conventional means. As belonging to the prior art, they are briefly described herein.

Further, to facilitate the internal water circulation, the bottoms of the two first cooling pipes 2 are communicated through a communicating pipe 21, which serves the purpose of communicating the two first cooling pipes 2 such that the internal water circulation is further facilitated.

When in use, the normal-temperature water in the water storage tank 1 flows out from the water tank and is divided into two paths: one path flows into the inlet of the first cooling pipe A2-1, and the other path flows into the inlet of the first cooling pipe B2-2. The water in the first cooling pipe A2-1 flows out from the outlet of the first cooling pipe A2-1, and the water in the first cooling pipe B2-2 flows out from the outlet of the first cooling pipe B2-2 (namely, the first cooling pipe A2-1 and the first cooling pipe B2-2 are connected in parallel). After the water flowing out from the first cooling pipe A2-1 and the water flowing out from the first cooling pipe B2-2 join together, the water flows into the thick-film heater 3 to be heated, so that the water temperature is quickly raised to a temperature of 90-100° C.

During use, the hot water (90-100° C.) flowing out from the outlet of the thick-film heater 3 passes through the first spiral cooling pipe 4 (the main function of the first spiral cooling pipe 4 is to perform an air cooling) and is cooled, in other words, pre-cooled in the first spiral cooling pipe 4. Subsequently, the hot water enters the second spiral pipe A11-1 (the second spiral pipe A11-1 is arranged within the first cooling pipe A2-1) and is cooled by the water in the first cooling pipe A2-1, thereby realizing the heat exchange, in other words, the primary water cooling. The hot water flowing out from the second spiral pipe A11-1 passes the NTC temperature sensor, and the NTC temperature sensor detects the water temperature.

If the water temperature after the primary water cooling is lower than the preset temperature (the preset temperature is normally about 40-45° C., suitable for brewing the milk powder), the three-way solenoid valve 15 is controlled by the controller, and in response to that, the inlet A and the outlet B of the three-way solenoid valve 15 are opened, and the outlet C is closed. At this point, the water being primarily cooled directly flows into the constant-temperature cabin 5 (the water in the constant-temperature cabin 5 is directly used for brewing the milk powder). Certainly, in this process, a small portion of the water flowing out from the outlet B may flow into the second spiral pipe B11-2 through a three-way joint (hose joint) and then flow to the outlet C of the three-way solenoid valve 15 through the second spiral tube B11-2. However, as the outlet C is in a closed state, the waterway isn't formed (namely, the second spiral pipe B11-2 is filled with a portion of water at most, which does not affect much).

If the water temperature is higher than the preset value after the primary water cooling, the inlet A of the three-way solenoid valve 15 is communicated with the outlet C, and the outlet B is closed. At this point, the water being primarily cooled flows into the second spiral pipe B11-2 (shown in FIG. 3) through the outlet C and is then further cooled by the water in the first cooling pipe B2-2, namely, undergoing the secondary water cooling. The water flowing out from the second spiral pipe B11-2 eventually flows into the constant-temperature bin 5 (similarly, there may be a small portion of the water flowing to the outlet B of the three-way solenoid valve 15 through the three-way joint, but which does not form a waterway because the outlet B is in a closed state). Finally, through the primary water cooling or the secondary water cooling, the variation of water temperature is achieved.

In this embodiment, the water-cooling frequency may be adjusted based on the variation of temperature. In summer, the secondary water cooling is normally required as the ambient temperature is high, but in winter, only the primary water cooling is required as the ambient temperature is low. The aforesaid design makes the waterway structure of the present disclosure more energy saving. The primary water cooling or secondary water cooling may be chosen based on the precise judgment of the NTC sensor. Moreover, the water in the water storage tank passes through the first cooling pipe A2-1, the first cooling pipe B2-2 and then enters the thick-film heater 3, enabling the heat generated during the heat exchange of the second spiral pipe A11-1 and the second spiral pipe B11-2 to be effectively utilized to preheat the water entering the thick-film heater 3. The aforesaid design not only ensures the temperature of the water heated by the thick-film heater 3, but also improves the energy-saving effect.

Embodiment 3

Figure 3:
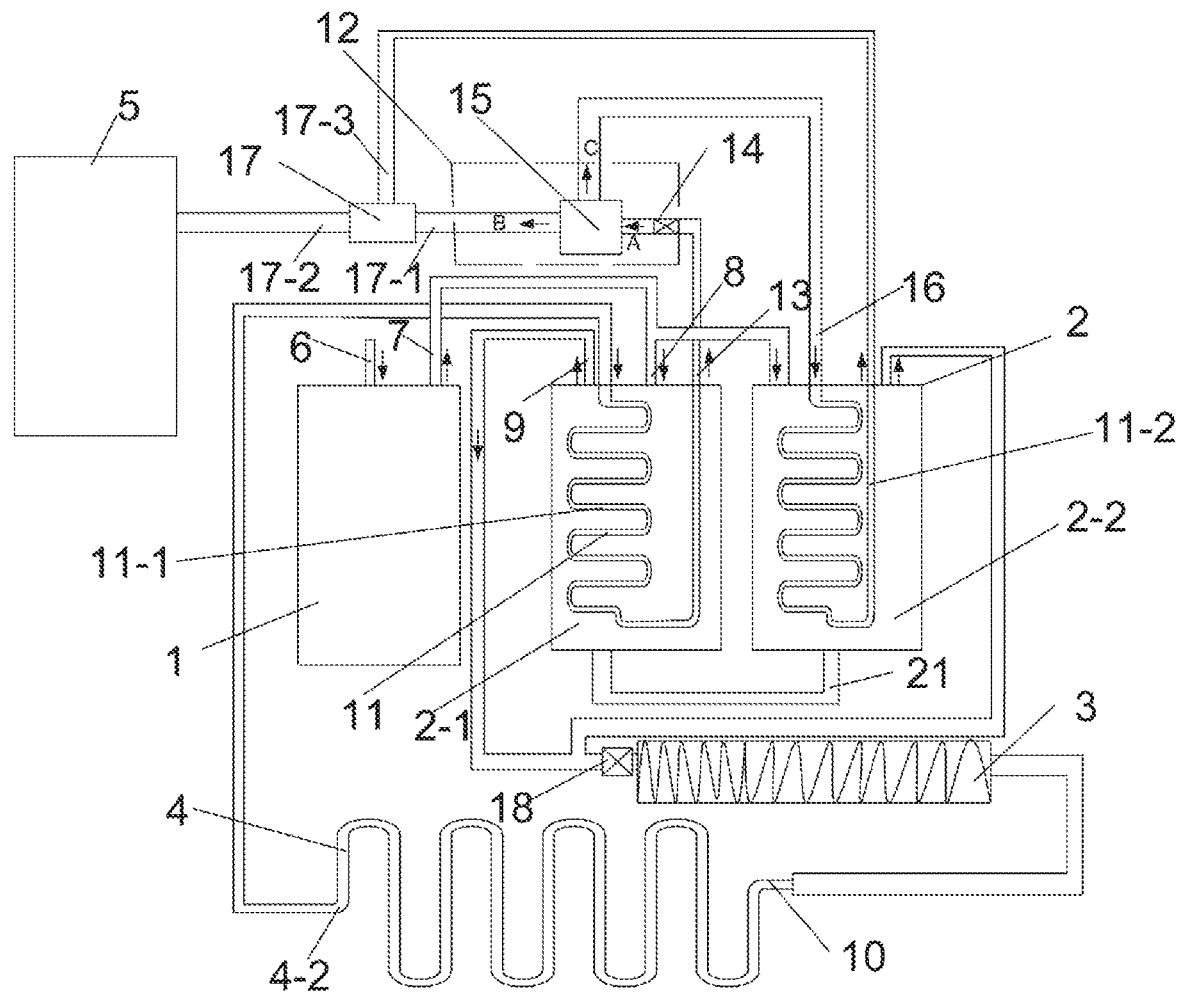
FIG. 3 is a conceptual diagram illustrating an example waterway structure of the milk powder brewing machine in embodiment 3.

FIG. 3 shows another waterway structure of the milk powder brewing machine of the present disclosure. In this embodiment, to facilitate the detection of water flow, a flow monitor 18 is arranged at the inlet of the thick-film heater 3. Through the arrangement of the flow monitor 18, the water flow is effectively monitored, achieving high accuracy of flow monitoring.

Embodiment 4

Figure 4:
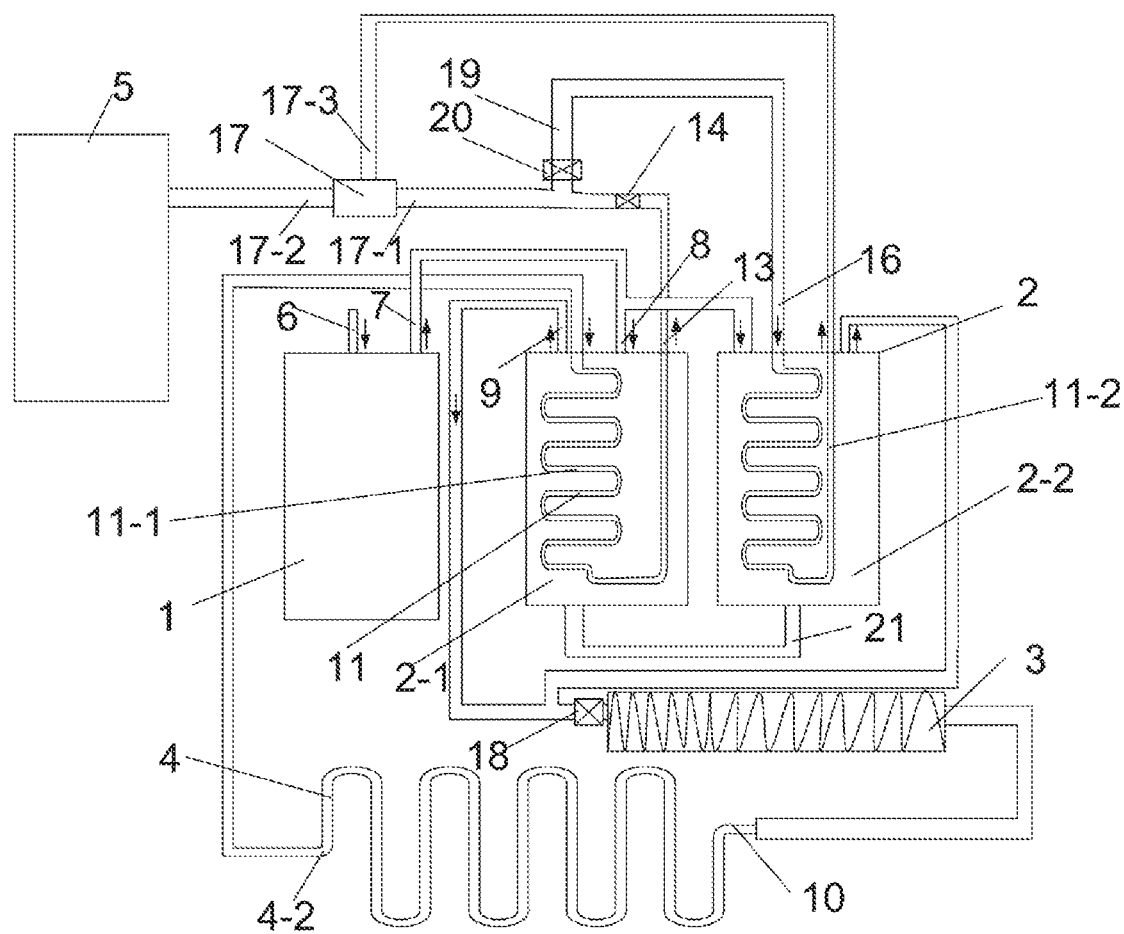
FIG. 4 is a conceptual diagram illustrating an example waterway structure of the milk powder brewing machine in embodiment 4.

FIG. 4 shows another waterway structure of the milk powder brewing machine of the present disclosure. Further, to make the whole waterway simpler, the three-way solenoid valve 15 is replaced by a one-way valve 20, and the third water outlet 13 of the second spiral pipe A11-1 is connected with the first pipe opening 17-1 of the three-way pipe 17. A branch path 19 connected with the third water inlet 16 of the second spiral pipe B11-2 is branched from the connection end of the third water outlet 13 and the three-way pipe 17, and the one-way valve 20 is arranged on the branch path 19. The third water outlet 13 of the second spiral pipe B11-2 is connected with the second pipe opening 17-2 of the three-way pipe 17, and the second pipe opening 17-2 of the three-way pipe 17 is connected with the constant-temperature bin 5. The liquid level in the third water inlet 16 of the second spiral pipe A11-1 is higher than that in the three-way pipe 17.

During use, when the water temperature detected at the outlet of the second spiral pipe A11-1 by the temperature detector 14 is higher than the preset temperature, the one-way valve 20 is immediately opened. For the liquid level in the third water inlet 16 of the second spiral pipe A11-1 is higher than that in the three-way pipe 17, the water flows directly from the branch path 19 and enters the third water inlet 16 of the second spiral pipe B11-2 for the secondary cooling. After being cooled, the water flows into the three-way pipe 17 and then enters the constant-temperature bin 5. By means of the aforesaid design, the secondary cooling effect is achieved with a simpler overall structure.

The above are merely preferred embodiments of the present disclosure, and the scope of the present disclosure is not limited to the embodiments described above. All technical solutions formed by equivalent modification or replacement shall fall into the scope of the present disclosure.

What is claimed is:

1. A waterway structure of a milk powder brewing machine, comprising:
    a water storage tank,
    a plurality of cooling pipes,
    a thick-film heater, and
    a constant-temperature bin which are communicated with each other, wherein a spiral pipe is arranged in each cooling pipe of the plurality of cooling pipes, wherein a water outlet of the water storage tank is connected with water inlets of the plurality of cooling pipes, and water outlets of the plurality of cooling pipes are connected with an inlet of the thick-film heater, wherein an outlet of the thick-film heater is connected with an inlet of the spiral pipe, and an outlet of the spiral pipe is connected with the constant-temperature bin, wherein water flowing from the water outlet of the water storage tank flows into the water inlets of the plurality of cooling pipes, wherein after the water flowing out from the water outlets of the plurality of cooling pipes join together, the water flows into the thick-film heater to be heated, wherein the hot water flowing the thick-film heater flows into the spiral pipe to be cooled, and after being cooled to a preset temperature, the water flows into the constant-temperature bin,
    wherein a pipeline switching unit capable of switching between a primary water cooling and a secondary water cooling according to the water temperature is arranged after one of the cooling pipes, wherein a three-way pipe is arranged between the switching unit and the constant-temperature bin,
    wherein the plurality of cooling pipes includes a first cooling pipe and a second cooling pipe, wherein a first spiral pipe is arranged in the first cooling pipe, and a second spiral pipe is arranged in the second cooling pipe;
    wherein a spiral cooling pipe is connected between the spiral pipe and the outlet of the thick-film heater;
    wherein the pipeline switching unit further comprises:
    a temperature detector capable of adjusting the number of times of water cooling according to the water temperature and a three-way solenoid valve, wherein the temperature detector is arranged on a third water outlet of the spiral pipe, and the three-way solenoid valve is arranged on the pipe at the rear end of the temperature detector, wherein a first outlet of the three-way solenoid valve is connected to the three-way pipe a second outlet of the three-way solenoid valve is connected to a third water inlet of the second spiral pipe.

2. The waterway structure of the milk powder brewing machine of claim 1, wherein the first pipe opening of the three-way pipe is connected with the three-way solenoid valve, the second pipe opening of the three-way pipe is connected with the constant-temperature bin, and the third pipe opening of the three-way pipe is connected with an outlet of the second spiral pipe.

3. The waterway structure of the milk powder brewing machine of claim 1, wherein the plurality of cooling pipes includes a first cooling pipe and a second cooling pipe, wherein a first spiral pipe is arranged in the first cooling pipe, and a second spiral pipe is arranged in the second cooling pipe, wherein the water flowing from the second water outlet of the spiral cooling pipe flows into the first spiral pipe for the primary water cooling, wherein after being primarily cooled, the water flows out and is detected by the temperature detector, wherein when the detected temperature is lower than or equal to the preset temperature, the inlet of the three-way solenoid valve is controlled to communicate with the constant-temperature bin through the three-way pipe, thereby delivering the hot water into the constant-temperature bin, wherein the pipeline of the three-way solenoid valve and the second spiral pipe is controlled to close at this point, wherein when the temperature detected by the temperature detector is higher than the preset temperature, the inlet of the three-way solenoid valve is controlled to communicate with the pipeline of the second spiral pipe, and the pipeline connecting the three-way solenoid valve and the three-way pipe is closed, wherein the hot water is delivered into the second spiral pipe for the secondary water cooling, and after being cooled, the hot water is delivered into the three-way pipe and then flows into the constant-temperature bin.

4. The waterway structure of the milk powder brewing machine of claim 1, wherein the temperature detector is a negative temperature coefficient (NTC) temperature sensor.

5. The waterway structure of the milk powder brewing machine of claim 1, a flow monitor is connected at the inlet of the thick-film heater.

6. The waterway structure of the milk powder brewing machine of claim 3, wherein the three-way solenoid valve is replaced by a one-way valve, and the third water outlet of the first spiral pipe is connected with the first pipe opening of the three-way pipe, wherein a branch path connected with the third water inlet of the second spiral pipe is branched from the connection end of the third water outlet and the three-way pipe, and the one-way valve is arranged on the branch path, wherein the third water outlet of the second spiral pipe is connected with the second pipe opening of the three-way pipe, and the second pipe opening of the three-way pipe is connected with the constant-temperature bin, wherein the liquid level in the third water inlet of the first spiral pipe is higher than that in the three-way pipe.

7. The waterway structure of the milk powder brewing machine of claim 1, wherein the bottoms of the plurality of cooling pipes are communicated through a communicating pipe.

8. The waterway structure of the milk powder brewing machine of claim 4, wherein the bottoms of the plurality of cooling pipes are communicated through a communicating pipe.

* * * * *